United States Patent [19]

Gornick et al.

[11] Patent Number: 4,654,522
[45] Date of Patent: Mar. 31, 1987

[54] MINIATURE POSITION ENCODER WITH RADIALLY NON-ALIGNED LIGHT EMITTERS AND DETECTORS

[75] Inventors: Robert F. Gornick, Edwardsburg, Mich.; John Zdanys, Jr., Elkhart, Ind.

[73] Assignee: CTS Corporation, Elkhart, Ind.

[21] Appl. No.: 828,586

[22] Filed: Feb. 10, 1986

Related U.S. Application Data

[63] Continuation-in-part of Ser. No. 534,731, Sep. 22, 1983, abandoned.

[51] Int. Cl.$^4$ ............................................. G01D 5/34
[52] U.S. Cl. ........................... 250/231 SE; 250/237 G
[58] Field of Search ............ 250/231 SE, 237 G, 208, 250/209; 340/347 P; 356/395

[56] References Cited

U.S. PATENT DOCUMENTS

| | | | |
|---|---|---|---|
| 3,196,279 | 7/1965 | Papelian | 250/231 SE |
| 3,268,885 | 8/1966 | Coyle et al. | 340/347 P |
| 3,824,587 | 7/1974 | Fowler | 250/231 SE |
| 3,846,788 | 11/1974 | Calabro et al. | 340/347 P |
| 3,946,225 | 3/1976 | Beeck | 250/237 G |
| 4,224,514 | 9/1980 | Weber | 250/237 G |
| 4,266,125 | 5/1981 | Epstein et al. | 250/231 SE |
| 4,345,149 | 8/1982 | Blaser | 250/231 SE |
| 4,387,374 | 6/1983 | Wiener | 250/231 SE |
| 4,423,958 | 1/1984 | Schmitt | 356/395 |
| 4,524,347 | 6/1985 | Rogers | 250/231 SE |

Primary Examiner—David C. Nelms
Attorney, Agent, or Firm—Rodger H. Flagg

[57] ABSTRACT

A miniature position encoder (10) provides means for transducing angular changes in shaft (60) position to an electrical output representing the Gray code. The miniature position encoder (10) comprises an annular housing (12) having an aperture (14) with a bushing (20) disposed therein opposite an open end (18) of the housing (12), a plurality of light emitting diodes (50) disposed in non-linear alignment in a substrate (40) mounted adjacent the bushing (20), and a metallic shaft (60) journalled within the bushing opening (15) and having a metallic logic disk (70) secured at one end, the logic disk having a plurality of radially spaced and angularly limited openings representing the Gray code. A window disk (110) is mounted within the housing cavity (28) and adjacent the logic disk (70) for the purpose of restricting the amount of light emitted by each of the light emitting diodes (50), and a plurality of phototransistors (100) are mounted upon a substrate (90) positioned at the open end (18) of the housing and adjacent the window disk (110), with a cover (120) enclosing the open end of the housing. Rotation of the shaft (60) effects rotation of the attached logic disk (70) which modulates the light passing through the openings within the logic disk, whereby the Gray code is transmitted as an eight bit parallel output code received by light receptors (100). The Gray code data may be transmitted directly to a microprocessor, or transmitted to an exclusive OR gate circuit for conversion into digital binary code.

19 Claims, 7 Drawing Figures

GRAY OR REFLECTED CODE

| POSITION | GRAY CODE INPUT BIT 8 7 6 5 4 3 2 1 | BINARY CODE OUTPUT BIT 8 7 6 5 4 3 2 1 |
|---|---|---|
| 0 | 0 0 0 0 0 0 0 0 | 0 0 0 0 0 0 0 0 |
| 1 | 0 0 0 0 0 0 0 1 | 0 0 0 0 0 0 0 1 |
| 2 | 0 0 0 0 0 0 1 1 | 0 0 0 0 0 0 1 0 |
| 3 | 0 0 0 0 0 0 1 0 | 0 0 0 0 0 0 1 1 |
| 4 | 0 0 0 0 0 1 1 0 | 0 0 0 0 0 1 0 0 |
| 5 | 0 0 0 0 0 1 1 1 | 0 0 0 0 0 1 0 1 |
| 6 | 0 0 0 0 0 1 0 1 | 0 0 0 0 0 1 1 0 |
| 7 | 0 0 0 0 0 1 0 0 | 0 0 0 0 0 1 1 1 |
| 8 | 0 0 0 0 1 1 0 0 | 0 0 0 0 1 0 0 0 |
| 9 | 0 0 0 0 1 1 0 1 | 0 0 0 0 1 0 0 1 |
| 10 | 0 0 0 0 1 1 1 1 | 0 0 0 0 1 0 1 0 |
| 11 | 0 0 0 0 1 1 1 0 | 0 0 0 0 1 0 1 1 |
| 12 | 0 0 0 0 1 0 1 0 | 0 0 0 0 1 1 0 0 |
| 13 | 0 0 0 0 1 0 1 1 | 0 0 0 0 1 1 0 1 |
| 14 | 0 0 0 0 1 0 0 1 | 0 0 0 0 1 1 1 0 |
| 15 | 0 0 0 0 1 0 0 0 | 0 0 0 0 1 1 1 1 |
| 16 | 0 0 0 1 1 0 0 0 | 0 0 0 1 0 0 0 0 |
| 17 | 0 0 0 1 1 0 0 1 | 0 0 0 1 0 0 0 1 |
| 18 | 0 0 0 1 1 0 1 1 | 0 0 0 1 0 0 1 0 |
| 19 | 0 0 0 1 1 0 1 0 | 0 0 0 1 0 0 1 1 |
| 20 | 0 0 0 1 1 1 1 0 | 0 0 0 1 0 1 0 0 |
| 21 | 0 0 0 1 1 1 1 1 | 0 0 0 1 0 1 0 1 |
| 22 | 0 0 0 1 1 1 0 1 | 0 0 0 1 0 1 1 0 |

FIG. 7

MINIATURE POSITION ENCODER WITH RADIALLY NON-ALIGNED LIGHT EMITTERS AND DETECTORS

This is a file wrapper continuation-in-part of application Ser. No. 06/534,731 filed Sept. 22, 1983, now abandoned.

TECHNICAL FIELD

This invention relates to a miniature absolute angle position encoder.

BACKGROUND ART

Shaft encoders, or what is sometimes known as position encoders, are well known in the art. Numerous designs have been developed and utilized in order to transduce the position of a rotatable shaft to an electrical output by means of a coded output. Tomasulo et al. U.S. Pat. No. 3,171,034 issued on Feb. 23, 1965 and entitled "Electro-Optical Control," illustrates an early design utilizing photo-cells which sense light transmitted through tracks varying from opacity to transparency. This is typical of the early uses of light sensitive photo-cells to effect an output corresponding directly to the change of shaft position. Leonard U.S. Pat. No. 4,259,570 issued Mar. 31, 1981 and entitled "Optical Comparator" and the related Epstein et al. U.S. Pat. No. 4,266,125 issued May 5, 1981 and entitled "Optical Shaft Angle Encoder," disclose and illustrate a shaft encoder that utilizes single phase differences to transmit the shaft position. The encoder has two tracks which generate square waves whose phase relationship is detected so that the position of the shaft is determined by the number of pulses received. This is an incremental shaft encoder device which utilizes a reference point or datum that must be established in order for the position of the shaft to be determined. If power to the device is momentarily interrupted, or deactivated for a period of time, the position of the shaft is not known without first establishing a datum and then counting incrementally to the present position.

Swenson U.S. Pat. No. 4,284,885 issued Aug. 18, 1981 and entitled "Optical Potentiometer" illustrates a device using phototransistors to sense the intensity of light transmitted through windows varying from opaque to transparent. Brienza et al. U.S. Pat. No. 4,338,518 issued July 6, 1982 and entitled "Position Encoder with Column Scanning and Row Sensing" discloses light transmitting optical fibers having portions of some of the fibers selectively masked at predetermined linear positions of the device so that a nine bit code is effected by the linear displacement of device components.

There has long been a need for a miniature shaft encoder or position encoder which is inexpensive, requires a minimum number of components, is easily assembled, and which may be used for a wide variety of applications. The prior art has not provided a device having an eight bit parallel code output which may be interfaced directly with a microprocessor such as those used in automotive applications. Such a device must be small in size, have a long functional life span, be inexpensive, and preferably comprise an absolute angle position encoder.

DISCLOSURE OF THE INVENTION

The miniature position encoder of the present invention is an absolute angle shaft encoder providing an eight bit output code readable by a microprocessor or readily converted into digital binary code also readable by a microprocessor. The miniature position encoder comprises an angular housing having, at an end opposite an open end of the housing, an aperture with a bushing located therein. A printed circuit board substrate is mounted adjacent the aperture, the substrate providing support for eight infrared emitting diodes positioned at various radii in non-linear or staggered alignment relative to a central substrate opening coaxial with the aperture. A metallic shaft is journalled in the bushing with one end of the shaft extending exteriorly of the housing and a metallic logic disk secured, by means of a drive arm, to the opposite end. The metallic logic disk comprises a plurality of radially spaced tracks with openings, the tracks representing an eight bit output code, specifically the Gray code. Each infrared emitting diode is aligned radially with a respective radial track of the metallic logic disk. A window disk comprising a metallic disk having a plurality of radially spaced pin hole openings, is mounted to a plastic backing and positioned adjacent the metallic logic disk. Each pin hole opening is aligned with a respective infrared emitting diode. An outer substrate is positioned adjacent the window disk and supports eight silicon phototransistors disposed at various radii relative to a central opening coaxial with the housing aperture and shaft. The phototransistors are aligned radially and linearly with the infrared emitting diodes. A cover is secured to the open end of the housing to enclose and capture the components within the housing, and a standard connector attached to the outer substrate to provide electrical I/O connections for the miniature position encoder.

The miniature position encoder of the present invention may be connected directly to a microprocessor which reads Gray code, or connected to an exclusive OR gate circuit which transduces the eight bit parallel code output into a binary code readable by a microprocessor.

Light from the infrared emitting diodes is transmitted through the respective track openings of the logic disk for reception by the aligned silicon phototransistors, with the light restricted by the respective pin hole openings of the window disk so that light emitted by one diode is not inadvertently sensed as light emitted by another diode. As the shaft is rotated, light emitted by the diodes is modulated by the angularly limited openings located within the logic disk. The angular change in shaft position is transmitted via the code contained in the radially spaced tracks of the logic disk, to the phototransistors and transmitted as an eight bit parallel code output. The code contained in the metallic logic disk is the Gray code which was chosen because one and only one digit of the code changes in proceeding to or from another shaft position. There is no intermediate instant which can be interpreted as a code number in error by more than one unit in the least significant position of the code. Thus, the device comprises a miniature absolute angle position encoder providing an eight bit parallel output code readable by a microprocessor.

BRIEF DESCRIPTION OF THE DRAWINGS

FIG. 7 is an illustration of a portion of a chart showing the correspondence between the Gray code input and the binary code output;

BRIEF MODE FOR CARRYING OUT THE INVENTION

Figures 1, 2:
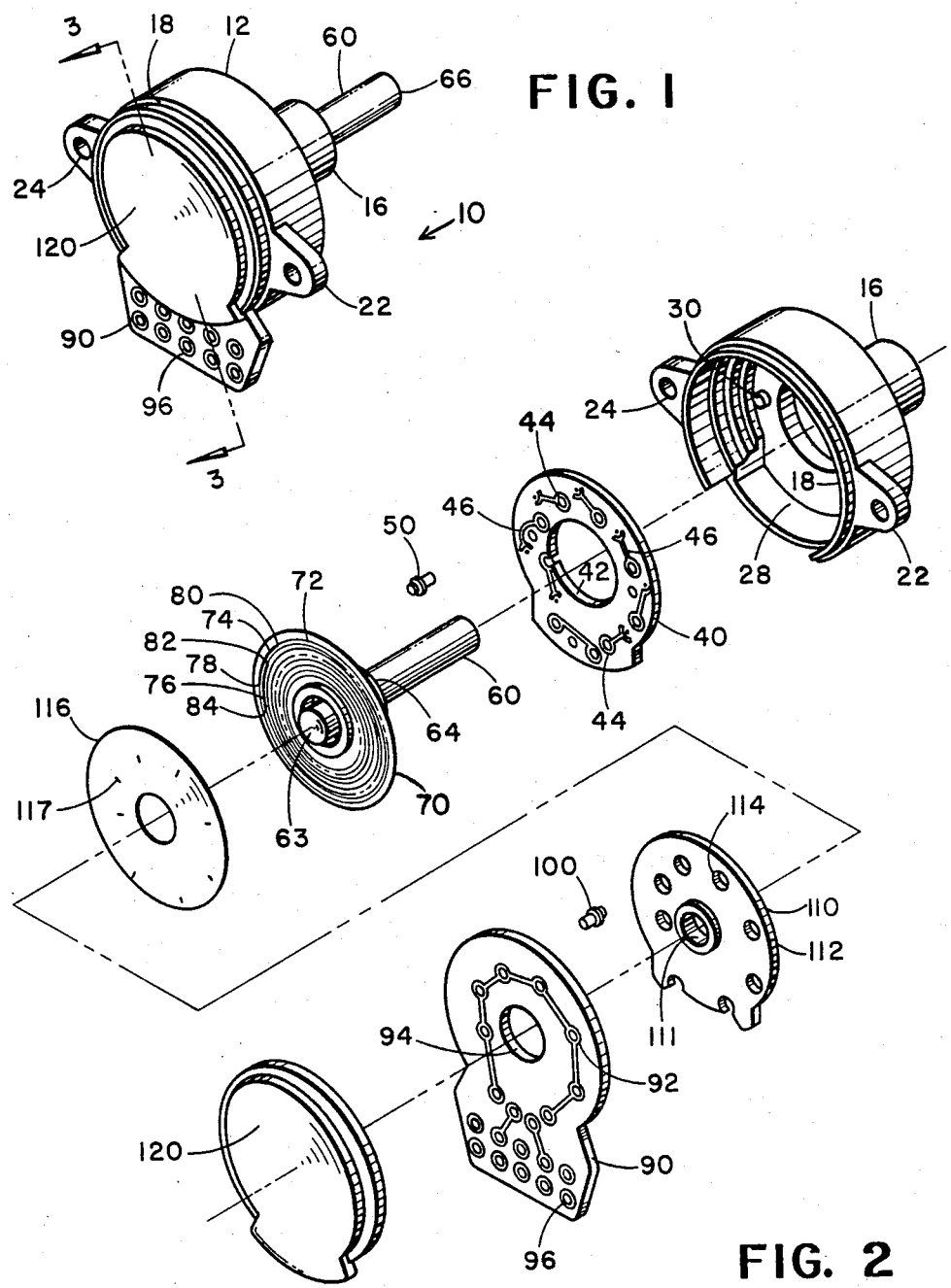
FIG. 1 is an isometric view of the miniature position encoder.
FIG. 2 is an exploded view of the miniature position encoder of FIG. 1.
Figure 3:
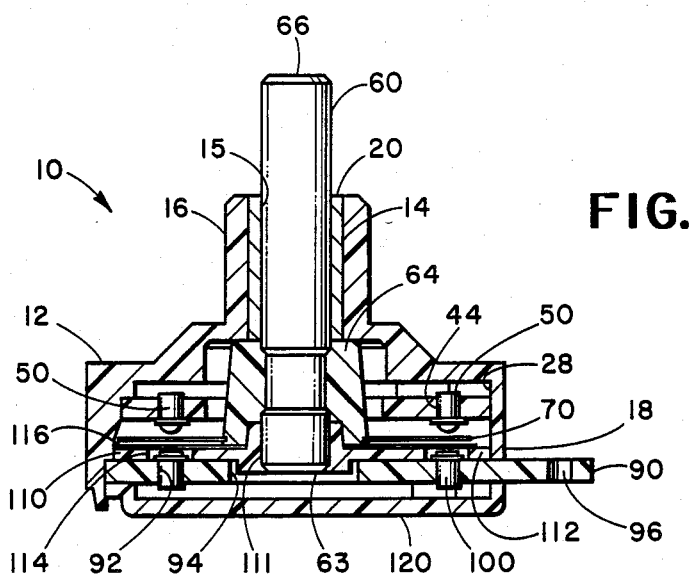
FIG. 3 is a section view taken along view line 3—3 of FIG. 1.

Referring now to the drawings, particularly FIGS. 1-3, the miniature position encoder is designated generally by reference numeral 10. The position encoder 10 comprises a housing 12 having an aperture 14 disposed in housing end 16 opposite open end 18. The housing consists of a thermoplastic resin such as Valox 420 provided by General Electric, and which is readily formed by molding processes well known in the art. Located within aperture 14 is carbon bearing or bushing 20 with opening 15, and extending outwardly from housing 12 are a pair of mounting tabs 22 having mounting openings 24. A pair of mounting projections 30 are located within the interior cavity 28 for mounting and securing a substrate thereto. Printed circuit board substrate 40 comprises a generally annular shaped substrate having a central opening 42 coaxial with housing aperture 14 and bushing opening 15, and has a plurality of eight radially disposed openings 44 disposed therein. Circuits 46 are disposed on both planar surfaces of substrate 40. Mounted within radially disposed openings 44 are eight infrared emitting diodes 50 connected electrically to circuits 46 by means of solder. Each diode is positioned so that it emits light towards open end 18 of housing 12.

Steel shaft 60 has a thermoplastic drive arm 64 secured at one end thereof, and a metallic logic disk 70 secured to the drive arm by insert molding. Logic disk 70 comprises a metallic disk having a plurality of radially spaced tracks including openings within the respective tracks. Each radially spaced track is radially aligned with a respective infrared emitting diode, whereby the respective diode will emit light towards its associated track and through any opening within that track when the opening is angularly aligned with the diode. The radially disposed openings in the tracks of the metallic logic disk represent an eight bit code.

The well-known Gray code was chosen for the eight bit output code of the present embodiment but it should be clearly understood that any number of eight bit codes may be utilized in the present invention. The Gray code has the property that one and only one digit of the code changes in proceeding to or from the next higher or lower number of the code. Utilizing the Gray code, there is no intermediate instant when an output can be interpreted as a number which is in error by more than one unit in the least significant position of the code. With binary codes, a large number or even all of the bits of the code can change in the movement to the next step, and therefore there is much greater error possible during rotation of the disk. No matter what the position of the logic disk, with the Gray code only one digit will change during rotation to the next angular position.

Figure 8:
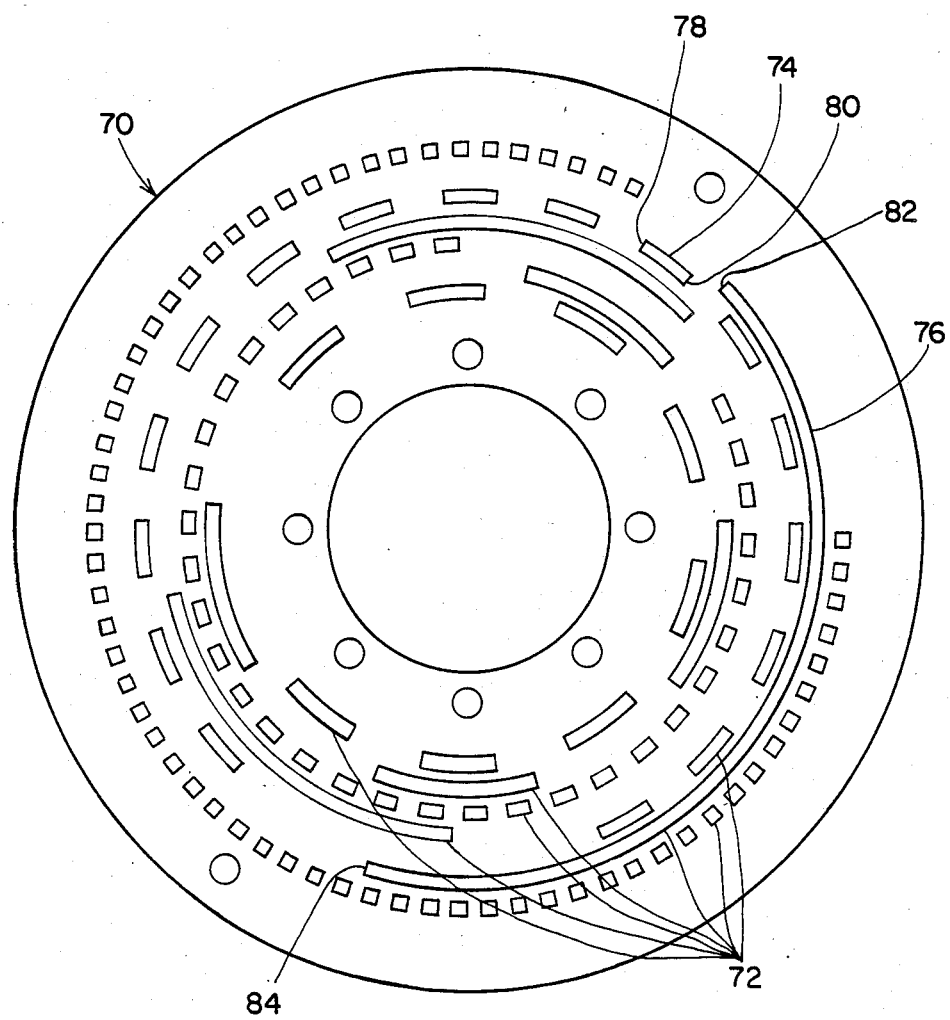
FIG. 8 is an illustration of the code disk according to the invention.

The metallic logic disk 70 illustrated in FIGS. 2 and 8 includes seven radially disposed tracks 72. It was found that two of the tracks of the eight bit Gray code had very similar openings, and therefore these tracks were combined into one track which is radially aligned with two light emitting diodes. Thus, there is still effected an eight bit parallel output code, but this is accomplished by utilizing only seven tracks 72 in logic disk 70. Additionally, it was found that the logic disk could be further strengthened by positioning the openings of each track, so that the beginning or ending edge of an arcuate opening does not coincide with the beginning or ending edges of openings of an adjacent track. Referring specifically to tracks 74 and 76 illustrated in FIG. 2, the edges 78 and 80 of track 74 do not coincide with the beginning and ending edges 82 and 84 of adjacent track 76. By offsetting the beginning and ending edges of an arcuate track opening relative to the openings of the adjacent tracks, this provides a strengthened metallic logic disk that is not easily damaged during assembly.

A window disk 110 comprises a thermoplastic resin disk 112 having a plurality of radially disposed openings 114 in alignment with pin hole slot openings 117 of metallic disk 116. Metallic disk 116 is insert molded to the disk backing 112, whereby slot shaped openings 117 are centrally disposed within backing openings 114, openings 114 and 117 being radially and linearly aligned with their associated infrared emitting diodes 50.

The metallic shaft 60 is journalled within opening 15 of carbon bearing 20 whereby end 66 extends exteriorly of the housing 12, and logic disk 70 is positioned adjacent the plurality of radially disposed emitting diodes 50. Each track 72 of disk 70 is aligned radially and linearly with a respective infrared emitting diode 50. An outer substrate 90 comprising a printed circuit board, has openings 92 disposed radially and linearly in alignment with infrared emitting diodes 50. Located within each substrate opening 92 is a silicon phototransistor 100 connected electrically to the printed circuit 94 by means of solder.

Housing cover 120 is secured to the open end 18 of housing 12 by heat staking the perimeter of the open end of housing 18 over the perimeter of cover 120. A standard rectangular shaped connector is secured to the plurality of terminations 96 located at the exterior of substrate 90. The connector (not shown) provides electrical I/O connections whereby the miniature position encoder 10 is provided with power for the infrared emitting diodes and silicon phototransistors and output connections for the eight bit parallel code output.

Figure 4:
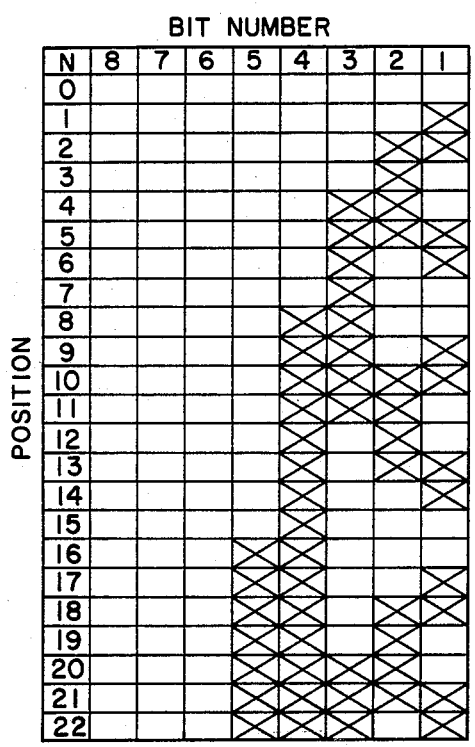
FIG. 4 is an illustration of a portion of a chart illustrating the eight bit code output of the Gray or reflected code.

Referring to FIG. 4, there is illustrated a portion of the Gray or reflected output code chart showing changes in the eight bit parallel output code as the shaft is rotated from one position to the next. The miniature position encoder of the present invention is designed so that there are preferably 256 steps or positions for 270 degrees of rotation. In other words, each step comprises 1.05 degrees of angular rotation of the shaft or preferably less than one and one half degrees of rotation per step, to produce a change in a single bit of the Gray code output. Each angular step or position (1.05 degrees) is represented by a distinct eight bit encoded output representing only that position of the shaft. As shown by the chart of FIG. 4, position zero, the starting point, is represented by an output which would be all zeros for each of the eight bits, i.e. light is transmitted by each of the infrared diodes 50 toward its respective track but no openings are in alignment for light to pass through the logic disk for reception by the linearly and radially aligned silicon phototransistors 100. As the shaft is rotated 1.05° to the next position, there is a change of only one bit of the Gray code, i.e. bit number 1 or track number 1 on the logic disk. The X-ed out area for bit number 1 of position number 1 on the chart represents a track opening allowing light transmission for reception by the respective silicon phototransistor. As the shaft and disk are rotated, each 1.05 degrees of angular displacement produces a single bit change in the eight bit code. Thus, the maximum error possible in moving from one position to another is one unit in the least significant position of the code. Binary codes may be utilized for the logic disk by the movement from one position to another can and does result in the change of numerous bits within the code, including a change of as many as all eight bits in an eight bit code whereby the error in the output can be exceedingly high.

Figure 6:
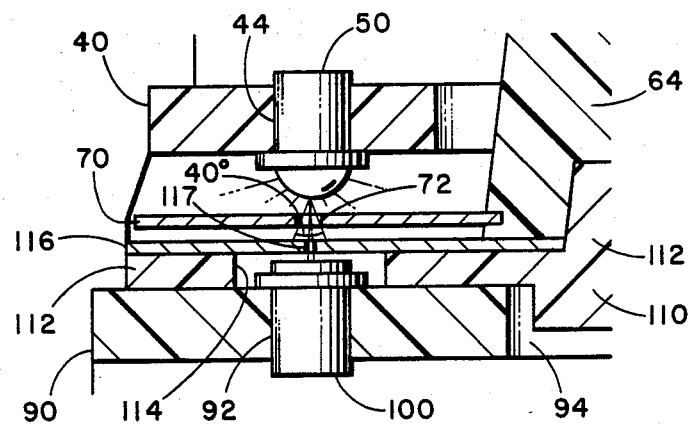
FIG. 6 is a schematic section view of the window disk and transmitted light.

The window disk 110 is illustrated in section view by FIG. 6. The purpose of window disk 110 is to restrict light emitted by a respective infrared emitting diode 50 so that light is received by only the linearly and radially aligned phototransistor 100. As shown in FIG. 6, light emitted from the diode 50 projects through an angle of approximately forty degrees. Because of the distance of the diode from its respective phototransistor, it is preferable to place a light restricting means such as a window disk adjacent the phototransistor so that light emitted from the diode is projected through a much smaller angle, approximately three degrees. This results in light transmitted through a track opening being received and detected only by the respectively aligned phototransistor 100.

Because an eight bit code such as the Gray code is utilized, the position encode is an absolute angle position encoder. This means that the exact angular position of the shaft and disk may be detected at any time and position because the error possibility is, at maximum, one unit, and each angular position has a distinctive code number applicable only to that position, regardless of the starting point of rotation. Additionally, the eight bit code provides an eight bit parallel output code, i.e. all eight bits are present simultaneously in the output and for transmission to an appropriate circuit. An eight bit code was chosen because most standard microprocessors utilize eight bit codes.

The present construction does not require any type of contactor, the code being effected by the combination of the diodes 50, disk 70, window disk 110, and transistors 100. This construction provides a very small size position encoder as compared to prior art constructions, it being no larger than a standard size 25 millimeter potentiometer. It has a long functional life span, and is designed so that assembly may be accomplished by merely stacking parts by what is called a "drop-in" placement of the components through the open end of the housing.

ASSEMBLY AND OPERATION

The miniature position encoder 10 is assembled by first molding the housing 12 by methods well known in the art. Carbon bearing 20 is fitted within aperture 14, and then printed circuit board substrate 40 with diodes 50 is mounted within the housing cavity 28. Projections 30 are received in complementary openings in the substrate 40, and heat swaged to secure substrate 40 to the housing.

Metallic logic disk 70 is attached to drive arm 64 by insert molding the arm 64 about the shaft end 63 and over the central opening of logic disk 70. The shaft is journalled within the carbon bearing opening 15 whereby shaft end 66 extends exteriorly of the housing end 16 and logic disk 70 is positioned adjacent the printed circuit board 40 with each diode 50 in radial alignment with a respective logic disk track 72. Next, the window disk 110 comprising the backing 112 with metallic plate 116 insert molded thereto, is mounted in the housing so that opening 111 receives shaft end 63. The plurality of slot openings 117 are radially and linearly aligned with the respective diodes 50. Printed circuit board substrate 90 is mounted in open end 18 of the housing 12, with opening 94 coaxial with shaft end 63 and each phototransistor 100 radially and linearly aligned with a respective diode 50. Each phototransistor 100 is radially and linearly aligned with a respective slot opening 117 whereby light projected from the respective infrared emitting diode 50 is restricted and received only by its associated phototransistor 100. Printed circuit board substrate 90 has a plurality of terminations 96 to which a standard connector is attached.

When shaft 60 is rotated, this produces a corresponding rotation of the attached logic disk 70. As each track 72 moves from one angular position to another, the track openings modulate light emitted from the respective diodes and received by the radially and linearly aligned phototransistors 70. Thus, the Gray code contained in the tracks of the logic disk is transmitted to the phototransistors which convey the code through the printed circuit board to the electrical connections.

Figure 5:
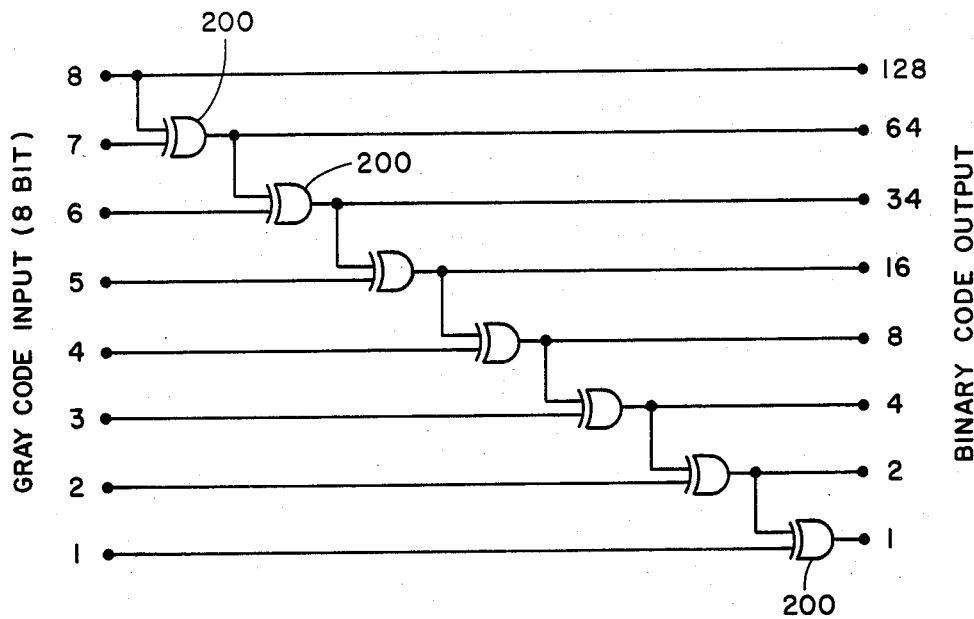
FIG. 5 is an illustration of an exclusive OR gate circuit that may be utilized to transduce the eight bit parallel code output into a binary code.

Referring now to FIG. 5, there is illustrated an exclusive OR gate electrical circuit for changing or transducing the eight bit parallel output code into a binary code. The eight bit parallel output code has all eight bits present simultaneously in the output. The Gray code was chosen as the preferred eight bit code which is readable by a microprocessor, but as an option the code can be converted to binary code also readable by a microprocessor. An exclusive OR gate circuit such as the circuit illustrated in FIG. 5 can transduce the eight bit Gray code output into binary code. Each of the code bits are fed to an exclusive OR gate 200, the exclusive OR gates 200 being cascaded so that each change in the bits of the code is transduced into binary code.

FIG. 7 illustrates the Gray code input for a given shaft position and its corresponding output in binary code. As the Gray code signal inputs are provided to the cascaded exclusive OR gates 200, the circuit effects corresponding binary outputs for the shaft positions. There are 256 distinct shaft positions for 270 degrees of rotation of the shaft, with the Gray code of the first 22 positions and the corresponding 22 binary code bits of information being illustrated in FIG. 7.

The miniature absolute angle position encoder of the present invention provides a commercially available, low cost, easily manufactured, reliable and long life position encoder having a wide variety of commercial uses. The encoder may be utilized to provide an output supplied to a special curve generator whereby any output curve corresponding to the code information is produced. The shaft position may be converted to special data output or multiplex output, may provide an analog voltage output or an analog current output, or provide for analog signal attenuation. Additionally, shaft position can be converted to provide a frequency versus rotation output, and the device may be utilized as a power control for alternating current or direct current, or be utilized as a stereo volume control. The stereo volume control may be utilized for 1.5 dB tracking, with an 88 dB range.

INDUSTRIAL APPLICABILITY

The present invention may be utilized for a wide variety of uses such as electrical controls and sensors.

CONCLUSION

Although the present invention has been illustrated and described in connection with one example embodiment, it will be understood that this is illustrative of the invention, and it is by no means restrictive thereof. It is reasonably to be expected that those skilled in the art can make numerous revisions and additions to the invention and it is intended that such revisions and additions will be included within the scope of the following claims as equivalents of the invention.

We claim:

1. A miniature contactorless absolute angle position encoder, comprising: a housing having an aperture at one end and an oppositely disposed open end; a plurality of light emitting means disposed within said housing and extending radially outwardly relative to said housing aperture, in non-linear alignment; a shaft within said housing aperture, said shaft having a logic disk thereon; said logic disk comprising a surface with a plurality of radially disposed openings therein; said openings disposed through said logic disk so that the beginning and ending edge of each said opening does not coincide with one of the beginning and ending edges of an adjacent radially disposed opening; a mask means disposed adjacent said logic disk and having a plurality of openings in alignment with the radially disposed light emitting means; a plurality of light receiving means disposed adjacent said mask means in alignment with the light emitting means; electrical connection means responsive to said light receiving means; and a cover secured adjacent to said light receiving means, said cover enclosing the open end of said housing; whereby rotation of said shaft rotates said logic disk with radially disposed openings so that light emitted by the light emitting means passes through said logic disk in accordance with the code of said logic disk and is received by said light receiving means for transmission of electrical signals representing said code through said electrical connection means whereby the absolute position of said shaft is transmitted by the code.

2. The position encoder in accordance with claim 1, wherein the code of said logic disk is an eight bit code, disposed upon seven radial tracks on said logic disk.

3. The position encoder of claim 2, wherein the eight bit code from said logic disk is compatible with the eight bit code of a microprocessor.

4. The position encoder in accordance with claim 1, wherein less than one and one-half degrees of angular change in the absolute position of the shaft produces a change in a single bit of the code.

5. The position encoder in accordance with claim 1, wherein said logic disk code comprises the Gray code.

6. The position encoder in accordance with claim 1, further comprising a printed circuit board mounted within said housing and supporting said light emitting means.

7. The position encoder in accordance with claim 1, wherein said housing comprises a generally circular housing with said cover heat stake secured thereto following assembly of the light emitting means; the shaft; the logic disk; the mask means; the light receiving means; and the electrical connection means within the housing.

8. The position encoder in accordance with claim 1, wherein said shaft is journalled in a metallic bushing within the housing aperature.

9. The position encoder in accordance with claim 1, further comprising circuit means operatively connected to said position encoder for converting said code into a binary code.

10. A miniature contactorless electro-optical control comprising:
a housing with an aperture at one end, and an oppositely disposed open end;
a first printed circuit board disposed within said housing, said first printed circuit board with circuitry thereon, and having a central aperture and a plurality of holes disposed in non-linear radial alignment therethrough;
a plurality of light emitting means disposed through said plurality of holes in the first printed circuit board, and operatively connected to the circuitry thereon; said light emitting means extending radially outwardly in non-linear alignment relative to said housing aperture;
a shaft extending through the housing aperture and the central aperture of said first printed circuit board; said shaft having a logic disk disposed adjacent to the first printed circuit board; said logic disk having a plurality of radially disposed openings therethrough;
a mask means disposed adjacent to the logic disk, said mask means having a plurality of apertures radially disposed in alignment with at least one of said light emitting means;
a window means adjacent to said mask means, said window means having a plurality of radially disposed apertures therethrough in alignment with the plurality of light emitting means;
a plurality of light detector means disposed through apertures in said window means; each of said light detector means positioned to receive light emitted from one of said light emitting means;
a second printed circuit means adjacent to said light detector means, with circuitry thereon in electrical communication with the plurality of light detector means; and a cover, adjacent to the second printed circuit means, said cover enclosing the open end of the housing, whereby rotation of said shaft angularly displaces the logic disk and openings therein to effect changes in light transmitted from the light emitting means, through the openings in the logic disk to the light detector means, to detect changes in shaft position and to communicate the absolute angle optical positioning of the shaft through the electrical circuitry disposed upon the second printed circuit board, said electrical signal transmitted therefrom as grey code data.

11. The electro-optical control of claim 10, wherein said cover is secured to said housing by heat staking following assembly of the first circuit board, the light emitting means, the shaft, the mask means, the window means, the light detector means and a second printed circuit means within the housing.

12. The electro-optical control of claim 10, wherein said logic disk comprises a metallic disk with radially spaced and angularly limited openings for effecting the transmission of the Gray code data via said light detector means.

13. The electro-optical control of claim 10, further comprising circuit means operatively connected to said electro-optical control for converting said Gray code data into a binary code.

14. The electro-optical control in accordance with claim 10, wherein the light detector means is connected by electrical connection means to an exterior circuit means.

15. The electro-optical control of claim 10, wherein said housing comprises a generally annular housing with the open end enclosed by a cover, and a bushing is provided in the aperture housing for receiving and journalling said shaft therein.

16. A miniature contactorless absolute angle position encoder, comprising: a housing with an aperture therethrough, said housing having disposed therein a plurality of non-rotating light emitting means, radially disposed in non-linear alignment; a rotatable shaft means with a portion extending exteriorally of said housing through said housing aperture; a logic disk rotatably supported by said shaft means; a non-rotating light restriction means having a plurality of apertures in alignment with said light emitting means; a plurality of non-rotating light receiving means in alignment with the plurality of light emitting means; an electrical connection means; and a housing enclosure means, wherein said rotating logic disk has a plurality of openings representing an eight bit output code and rotation of said shaft rotates said logic disk to effect the transmission of an eight bit output code in response to an optic code passing between said light emitting means and said light receiving means, said output code passing through said electrical connection means.

17. The position encoder in accordance with claim 16, further comprising circuit means operatively connected with said electrical connection means for converting said eight-bit parallel output code into binary code.

18. The position encoder in accordance with claim 16, wherein the housing aperature has a journalling means disposed therein to rotatably receive the shaft therethrough.

19. A process for transmitting the absolute angular position of a shaft by means of a miniature contactorless absolute angle position encoder, comprising the steps of (a) disposing a shaft supporting a logic disk within a housing, said logic disk having predetermined openings providing an eight-bit output code and being positioned between a plurality of light emitting means radially disposed in non-linear alignment; light restricting means; and a plurality of light receiving means located within said housing in alignment with the light emitting means; (b) emitting light from said light emitting means whereby said emitted light is directed toward said logic disk and passes through the predetermined openings disposed within said logic disk, (c) receiving light transmitted through said openings in said logic disk through said restricting means to said receiving means, and (d) transmitting electrical signals representing said received light whereby the eight-bit code provided by said disk is transmitted in the form of a eight-bit parallel output code representing the absolute angular position of said shaft.

* * * * *